Patented July 10, 1923.

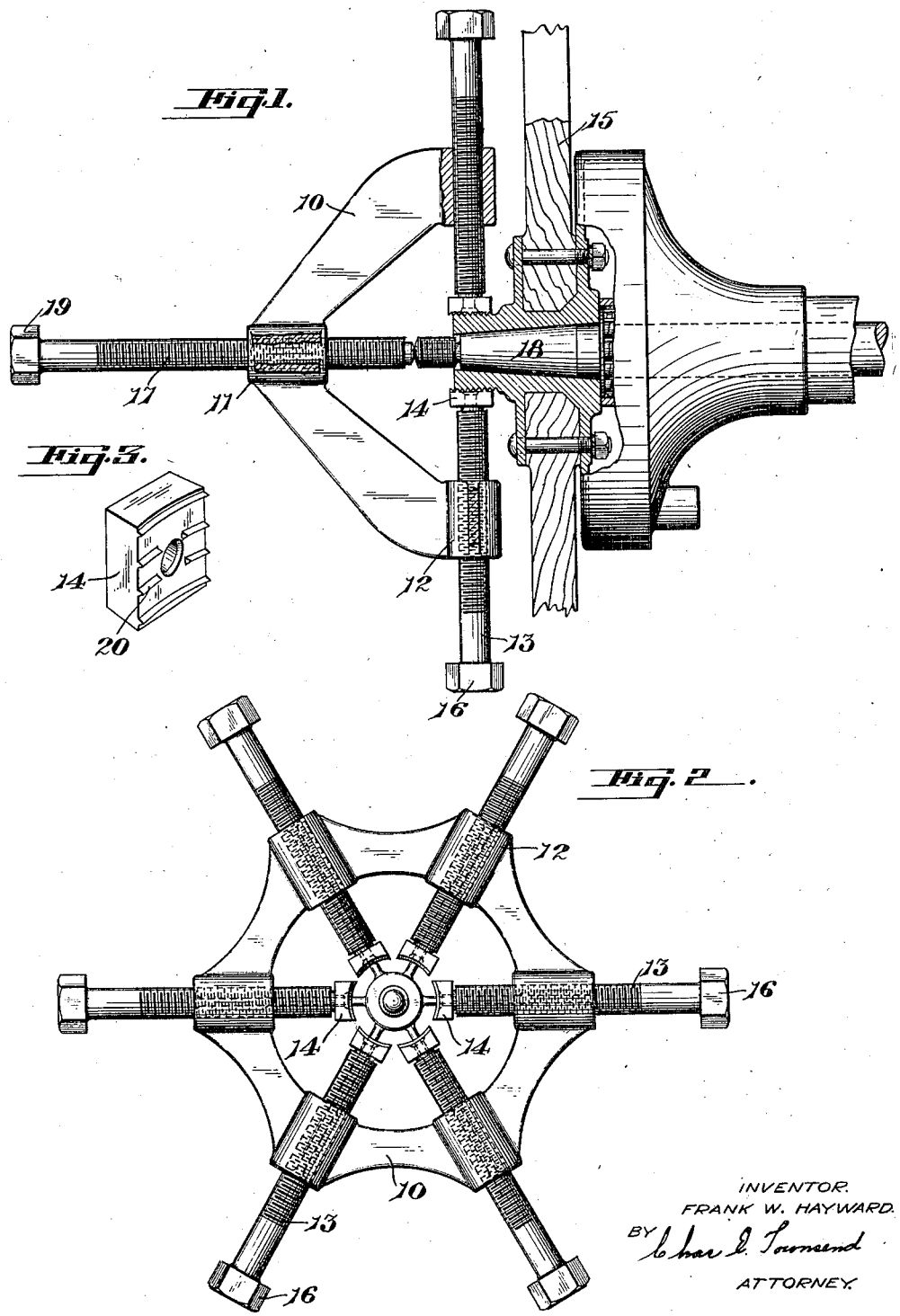

1,461,312

UNITED STATES PATENT OFFICE.

FRANK W. HAYWARD, OF SAN FRANCISCO, CALIFORNIA, ASSIGNOR TO KIMMERLE BROS., OF SAN FRANCISCO, CALIFORNIA, A PARTNERSHIP COMPOSED OF DANIEL S. KIMMERLE AND LARNED KIMMERLE.

WHEEL PULLER.

Application filed February 20, 1922. Serial No. 537,731.

*To all whom it may concern:*

Be it known that I, FRANK W. HAYWARD, a citizen of the United States, residing at the city and county of San Francisco and State of California, have invented new and useful Improvements in Wheel Pullers, of which the following is a specification.

This invention relates to appliances for removing vehicle wheels from their axles or shafts, and more particularly automobile wheels.

The device in general comprises a hub engaging means carried by a frame and a screw-threaded bolt fitted on the frame and engageable with the end of the axle whereby when the bolt is turned down the wheel will be pulled from its axle by the hub engaging members. The object of the present invention is to simplify and improve the construction and operation of a device of this character and to provide such elements as will make a single size puller applicable to a large variety of sizes of wheel hubs.

One form which my invention may assume is exemplified in the following description and illustrated in the accompanying drawing, in which—

Fig. 1 shows a side elevation, partly in section, of a wheel puller embodying my invention applied to an automobile wheel.

Fig. 2 shows a plan view of the same.

Fig. 3 shows a perspective of one of the shoes for engaging the hub of the wheel.

The device comprises a conical frame 10 formed with an axially extending bearing 11 at its apex and a series of equally spaced radially extending bearings 12 at its base. Screw threaded into each bearing 12 is a clamping bolt 13 carrying at its inner end a swiveled shoe 14. This shoe is provided with threads to co-act with the threads on the hub of an automobile wheel, indicated at 15. The outer ends of the clamping bolts are preferably formed with heads 16 to receive a wrench or similar tool for turning them tightly against the hub.

Into the bearing 11 is screw threaded a thrust bolt 17 so positioned as to engage at its inner end with the end of the axle 18 of the wheel. The outer end of the thrust bolt has a head 19 to receive a wrench or similar tool whereby to turn the bolt down so as to exert a thrust on the end of the axle and in this manner to pull the wheel from its axle.

The base of the frame is made large enough to accommodate the largest sizes of wheel hubs and the shoes are provided with threads 20 spaced four to the inch, so that they fit any standard threads used on wheel hubs, which are twelve, sixteen or twenty to the inch. Therefore the one size of tool can be used for all sizes of wheels. The equally spaced adjustable clamping bolts will insure that the thrust bolt is always properly centered.

Having thus described my invention, what I claim and desire to secure by Letters Patent is:

1. A wheel puller comprising a conical frame having an axially extending bearing at its apex and a series of equally spaced radially extending bearings at its base, a gripping bolt screw threaded into each of the last-named bearings and carrying at its inner end a swiveled shoe formed with threads to co-act with the threads on a wheel hub and a thrust bolt screw threaded into the axial bearing and adapted to engage with the end of the axle of the wheel.

2. A wheel puller comprising a conical frame having an axially extending bearing at its apex and a series of equally spaced radially extending bearings at its base, a gripping bolt screw threaded into each of the last named bearings and carrying at its inner end a swiveled shoe formed with threads to co-act with the threads on a wheel hub, and a thrust bolt screw threaded into the axial bearing and adapted to engage with the end of the axle of the wheel, said shoes being formed with threads spaced four to the inch whereby to co-act with any of the standard threads commonly used on wheel hubs.

FRANK W. HAYWARD.